United States Patent
Peterson et al.

(10) Patent No.: US 7,614,470 B2
(45) Date of Patent: Nov. 10, 2009

(54) TORQUE PROPORTIONING CONTROL SYSTEM

(75) Inventors: John A. Peterson, Troy, MI (US); William J. Young, Rochester, MI (US)

(73) Assignee: Borgwarner, Inc., Auburn Hills, MI (US)

( * ) Notice: Subject to any disclaimer, the term of this patent is extended or adjusted under 35 U.S.C. 154(b) by 403 days.

(21) Appl. No.: 11/247,550

(22) Filed: Oct. 11, 2005

(65) Prior Publication Data

US 2007/0095593 A1 May 3, 2007

(51) Int. Cl.
*B60K 17/34* (2006.01)
(52) U.S. Cl. .................. 180/197; 180/245; 180/246
(58) Field of Classification Search .............. 180/197, 180/248, 245, 246; 701/69
See application file for complete search history.

(56) References Cited

U.S. PATENT DOCUMENTS

| | | | |
|---|---|---|---|
| 5,701,247 A * | 12/1997 | Sasaki | 701/1 |
| 5,875,865 A | 3/1999 | Wakahara et al. | |
| 6,360,156 B1 | 3/2002 | Morganroth et al. | |
| 6,580,994 B2 | 6/2003 | Katayama et al. | |
| 6,631,779 B2 | 10/2003 | Watson et al. | |
| 6,634,451 B2 | 10/2003 | Sakakiyama | |
| 6,790,154 B1 * | 9/2004 | Kelley, Jr. | 475/150 |
| 6,830,122 B2 | 12/2004 | Kroppe | |
| 6,873,896 B2 | 3/2005 | Maekawa et al. | |
| 6,907,953 B2 | 6/2005 | Shigeta et al. | |
| 7,264,077 B2 * | 9/2007 | Mori et al. | 180/233 |
| 2002/0003057 A1 | 1/2002 | Mori et al. | |
| 2004/0168846 A1 | 9/2004 | Maekawa et al. | |
| 2004/0176899 A1 * | 9/2004 | Hallowell | 701/84 |
| 2005/0029035 A1 | 2/2005 | Shigeta et al. | |

OTHER PUBLICATIONS

News Flash—2005 RL-AWD.*

* cited by examiner

*Primary Examiner*—Tony H. Winner
(74) *Attorney, Agent, or Firm*—Brinks Hofer Gilson & Lione

(57) ABSTRACT

A method of proportioning and delivering drive torque to the four wheels of a vehicle includes the steps of sensing the wheel speeds, yaw rate and body side slip of the vehicle, calculating the torque split for delivery to the front, rear, left and right of the vehicle, calculating the percentage of torque to be provided to the four wheels of the vehicle scaling such torque delivery based upon driveline architecture of the vehicle and delivering drive torque to the four wheels of the vehicle.

20 Claims, 3 Drawing Sheets

TORQUE PROPORTIONING CONTROL SYSTEM

TECHNICAL FIELD

This invention relates generally to vehicle dynamics control systems and more particularly to a vehicle dynamics control system and method of operation which senses certain vehicle parameters and delivers drive torque to the vehicle wheels to improve the performance and stability of the vehicle.

BACKGROUND OF THE INVENTION

Over the last several decades, vehicle stability systems have increased both their sophistication and market penetration. Early vehicle stability systems sensed the speeds of the four wheels of the vehicle and continuously monitored these speeds to detect a speed difference which was interpreted as wheel slip. Based upon a sensed wheel speed difference, the delivery of torque to the vehicle wheels would be adjusted to reduce or eliminate such wheel speed differences and slip. Early systems energized a clutch in a transfer case resulting in a shift of delivery of 100% of the torque to the rear wheels to 50% to the front wheels and 50% to the rear wheels. Such a system is disclosed in co-owned U.S. Pat. No. 4,989,686 to Miller et al.

Later, more sophisticated control systems utilized timed, stepwise or incremental actuation of the transfer case clutch. Such a system is disclosed in co-owned U.S. Pat. No. 5,407,024 to Watson et al.

Inherent in the control architecture of these and numerous other vehicle traction and stability control systems is the fact that the systems do not commence operation and torque redistribution until a reduced traction and slip event has occurred and been detected. Thus, there may be a brief period of time between wheel slip and recovered stability that may be perceptible by the vehicle operator and passengers. While it is true that the slip threshold may be reduced to any quantative value, from a practical standpoint, the slip threshold cannot be reduced without limit as a small threshold value will result in nuisance engagements of the stability system which may be more noticeable to the vehicle occupants than the less frequently encountered brief interval between slip and correction during an event for which the system was intended.

The foregoing suggests that a system which monitors various vehicle parameters and proportions drive torque to the four vehicle wheels to provide vehicle stability would be desirable.

SUMMARY

A method and apparatus for proportioning and delivering drive torque to the four wheels of a vehicle includes the steps of sensing the wheel speeds and steering angle, sensing or calculating vehicle yaw rate and calculating vehicle body side slip, calculating the torque split to the front, rear, left and right wheels of the vehicle, calculating the percentage of torque to be provided to the four wheels of the vehicle, scaling such torque delivery based upon the driveline architecture of the vehicle and delivering drive torque to the four wheels of the vehicle. The available torque may be sensed by an engine speed sensor or similar device and provided to the control system.

Thus it is an object of the present invention to provide a torque distributing control system.

It is a further object of the present invention to provide a torque control system which senses wheel speed, yaw and body side slip.

It is a still further object of the present invention to provide a torque control system which calculates a torque split and distributes torque to the four wheels of a motor vehicle.

It is a still further object of the present invention to provide a torque control system wherein the vehicle driveline architecture affects the distribution of torque to the four wheels of the vehicle.

It is a still further object of the present invention to provide a torque control system having an available torque sensor which senses the speed of the engine.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1A:
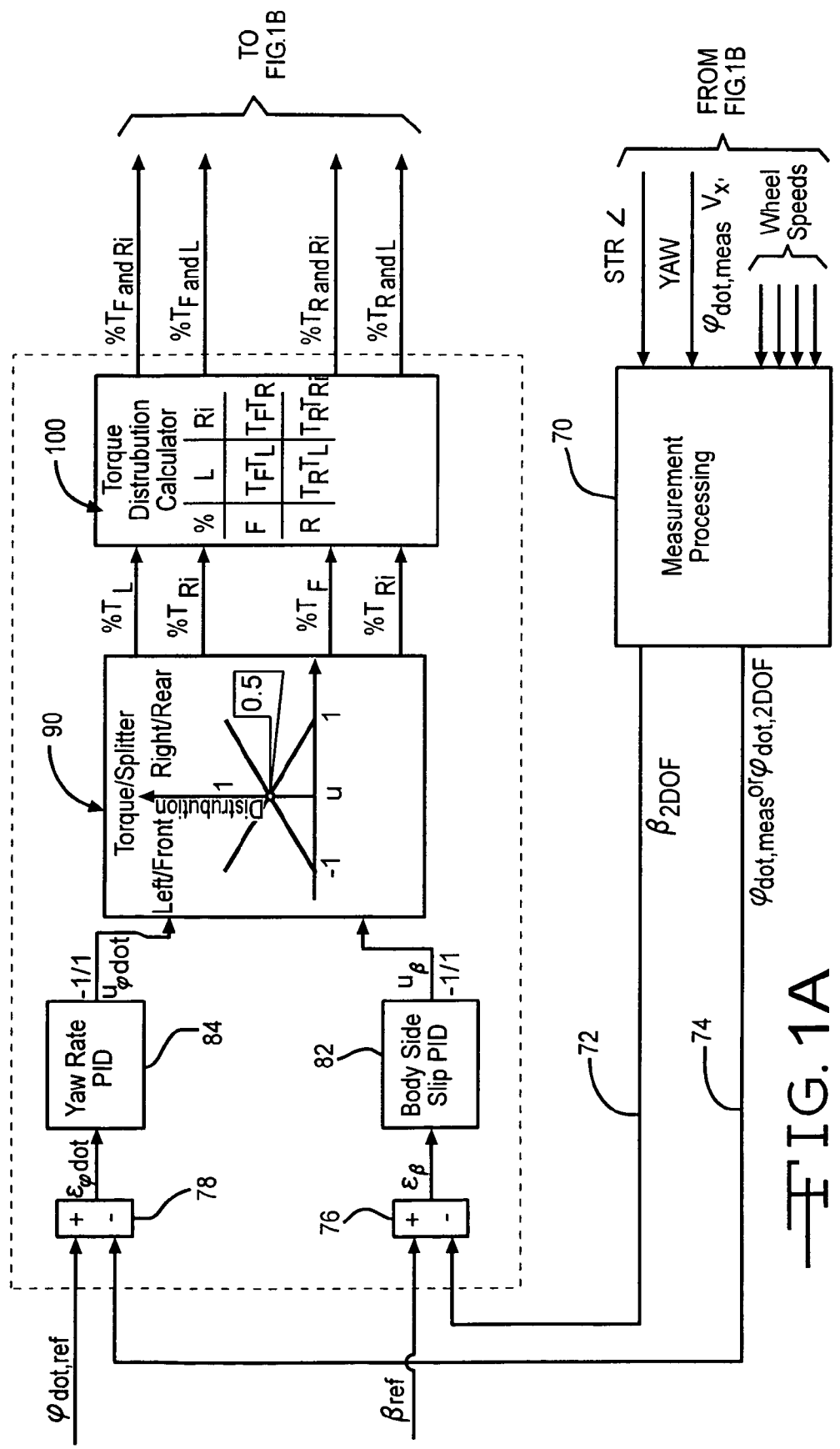
FIG. 1A presents a diagrammatic illustration of data input and a portion of the computation process incorporated in the torque distribution system according to the present invention.
Figure 1B:
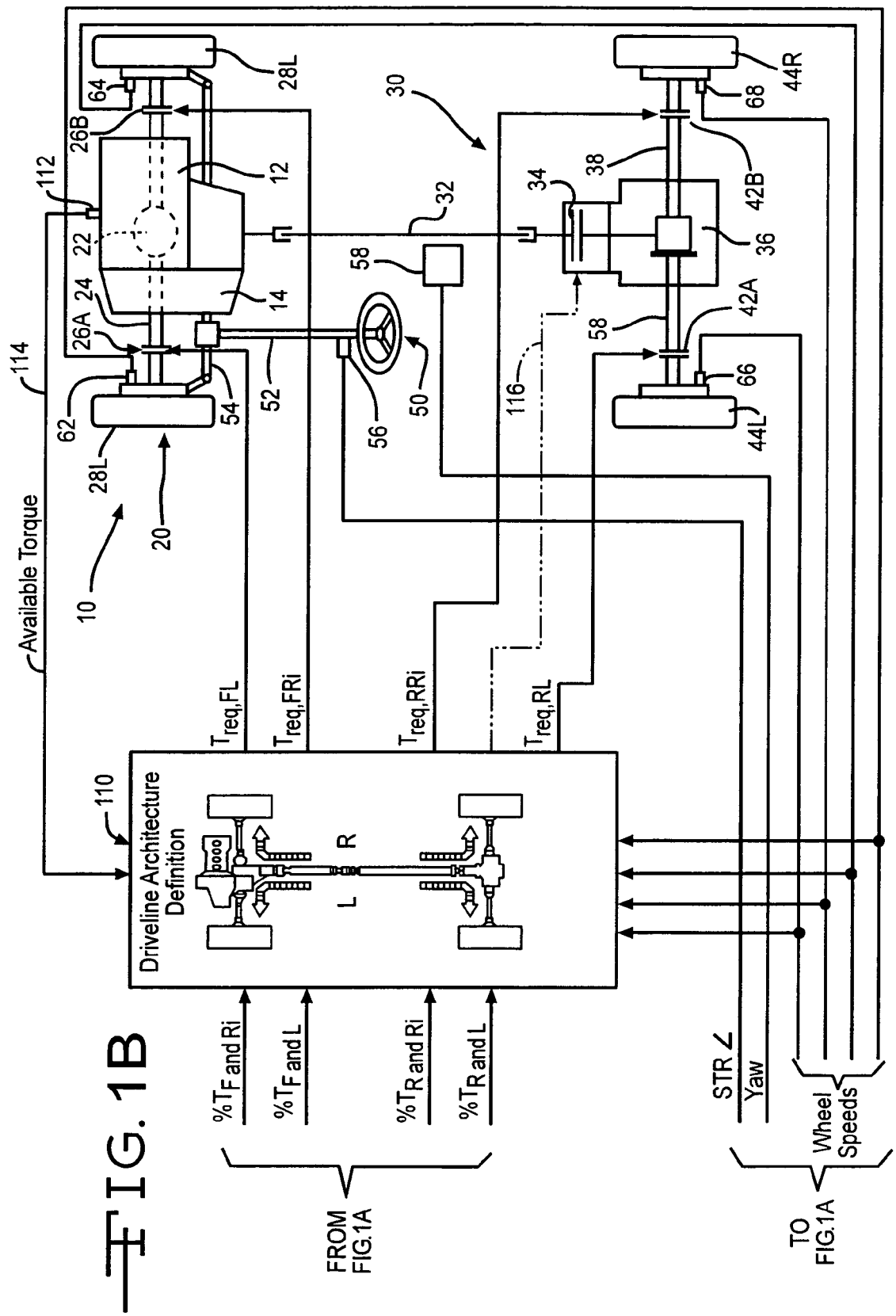
FIG. 1B is a diagrammatic illustration of the remaining portions of a torque distribution vehicle stability system and four wheel vehicle drive train according to the present invention.

Referring now to FIG. 1B, a diagrammatic view of a motor vehicle chassis and power train assembly utilizing the present invention is illustrated and designated by the reference number 10. The motor vehicle chassis and power train assembly 10 includes a prime mover 12 which is transversely oriented, associated with and drives a transaxle 14. The prime mover 12 may be a gas or diesel internal combustion engine or may be a hybrid power plant. Alternatively, the prime mover 12 may be longitudinally oriented and drive a conventional transmission and transfer case (both not illustrated). In turn, the transaxle 14 drives a primary or front drive assembly 20 having a front differential 22 driving a pair of front half shafts 24. Optionally, a pair of modulating friction clutch assemblies 26A and 26B selectively couple the half shafts 24 to a respective pair of front tire and wheel assemblies 28L and 28R.

Similarly, a secondary or rear drive assembly 30 includes a suitable longitudinally extending propshaft 32 which may drive a modulating friction clutch assembly 34 having its output provided to a conventional differential assembly 36. Alternatively, the friction clutch assembly 34 may be omitted and the propshaft 32 may drive the rear differential 36 directly. The rear differential 36 drives, through a conventional caged differential assembly a pair of rear half shafts 38 which drive an optional left and right pair of modulating friction clutch assemblies 42A and 42B which in turn drive respective rear tire and wheel assemblies 44L and 44R. It will be appreciated that if the modulating friction clutch assembly 34 is utilized, the individual left and right friction clutch assemblies 42A and 42B will generally not be utilized and vice versa.

The motor vehicle chassis and power train assembly 10 also includes a steering system 50 having a steering column 52 and associated steering linkage 54 which rotates the front tire and wheel assemblies 28 about a substantially vertical axis according to conventional practice. A steering angle sensor 56 associated with either the steering column 52 or another moving component of the steering linkage 54 which indicates the real time angular position of the front tire and wheel assemblies 28L and 28R provides an output signal. The steering angle sensor 56 may be located and associated with any conveniently accessible, moving component of the vehicle steering system 50. It has been found preferable, however, to associate the steering angle sensor 56 with the steering column 52 inasmuch as the rotation of this component provides the most significant motion and therefore the highest resolution indication of position. It will be appreciated however, that linear sensors associated with a transversely moving component of the steering linkage 54 such as a steering rack may also be utilized. Scaling and polarity (either plus or minus when the steering system is left or right of center) of the signal may be in accordance with various manufacturing or industry standards. A yaw rate sensor 58 such as an accelerometer may be conveniently placed within the vehicle or driveline 10 and provides a suitable output.

Finally, the motor vehicle chassis and driveline assembly 10 preferably includes a plurality of wheel speed sensors. A first wheel speed sensor 62 provides data regarding the speed of the left front tire and wheel assembly 28L. A second sensor 64 provides wheel speed data regarding the right front tire and wheel assembly 28R. A third wheel speed sensor 66 provides data regarding the speed of the left rear tire and wheel assembly 44L and a fourth wheel speed sensor 68 provides data regarding the wheel speed of the right tire and wheel assembly 44R. It will be understood that each of the sensors 62, 64, 66 and 68 will typically be associated with a tone wheel (not illustrated) mounted to an adjacent rotating axle. While just described as dedicated sensors, the four sensors 62, 64, 66 and 68 may alternatively be a part of and shared with other vehicle systems such as anti-lock brake systems (ABS) or a car area network (CAN).

Referring now to FIG. 1A, the data from the sensors 56, 58, 62, 64, 66 and 68 is provided to a measurement processing module 70. The measurement processing module 70 conditions and processes the various data streams from the various sensors 56, 58, 62, 64, 66 and 68. For example, data from the four wheel speed sensors 62, 64, 66 and 68 may be averaged to provide an accurate indication of the speed of the vehicle. Alternatively, the speeds of any of the tire and wheel assemblies 28L, 28R, 44L and 44R which are not presently being supplied with drive torque from the prime mover 12 and the transaxle 14 may be utilized separately, or averaged if two wheels are not being driven, since the speed of wheels which are not being supplied with drive torque are, with high likelihood, rotating at a speed corresponding to the actual vehicle speed.

Downstream software and computation modules require data regarding body or vehicle slide slip angle, i.e., lateral or transverse speed, and yaw rate. If the vehicle or chassis and power train assembly 10 is equipped with a yaw rate sensor 58 as noted, this signal may be used directly. If it is not, the other data or signals may be utilized to compute an estimated yaw rate in the measurement processing module 70. Similarly, an estimated body slide slip angle may be calculated from the wheel speeds and other data presented to the measurement and processing module 70 such as the steering angle from the steering angle sensor 56.

Figure 2:
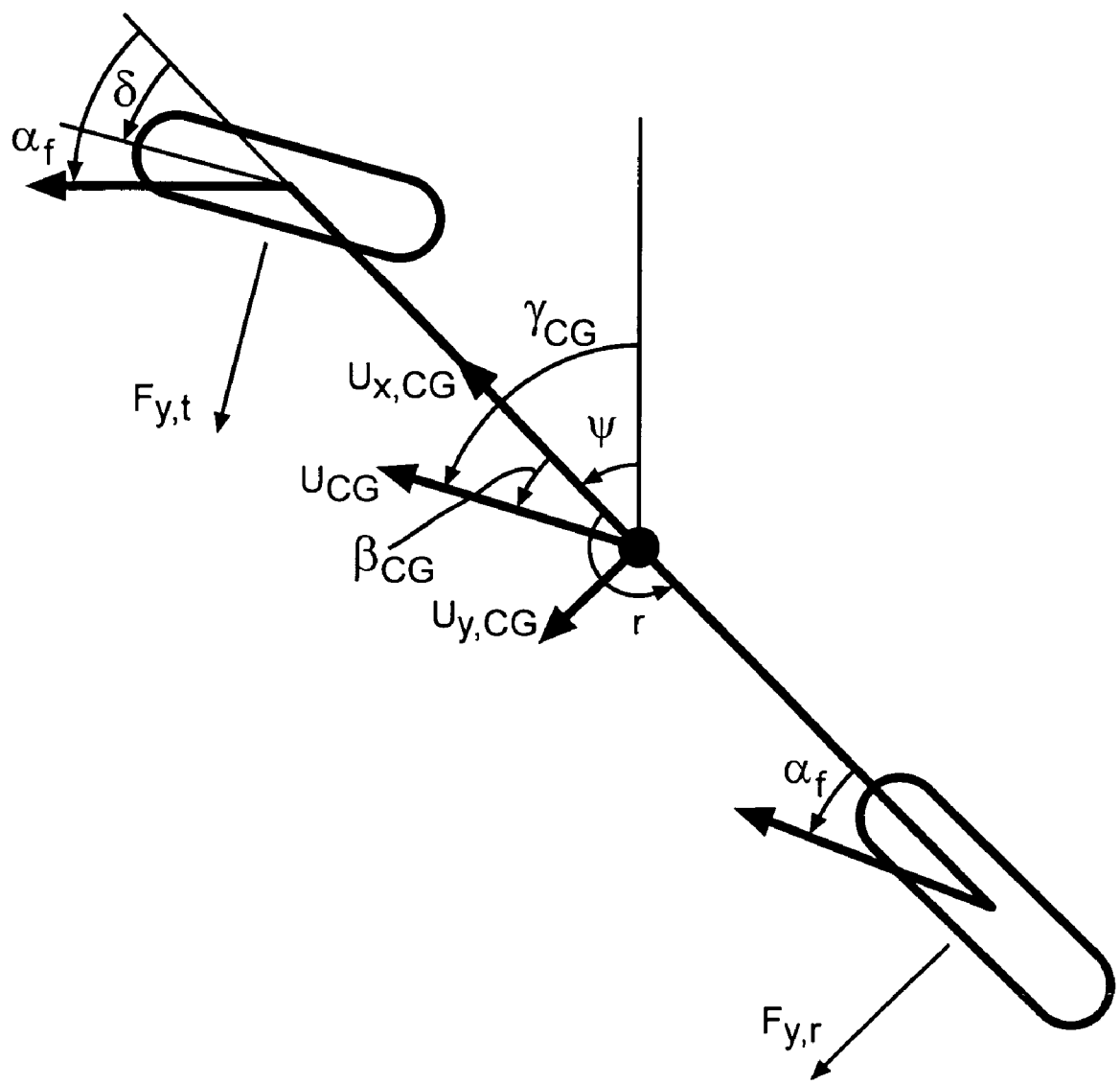
FIG. 2 is a diagrammatic view of a two degree of freedom (2 DOF) bicycle model which is a paradigm for body side slip calculations according to the present invention.

In this regard, the measurement and processing module 70 may utilize a 2 DOF (degree of freedom) bicycle model having a nonlinear tire model with yaw rate and body slide slip angle being the estimated states. A diagram of an idealized 2 DOF bicycle model is illustrated in FIG. 2. Given this model, $$Izz^*\ddot{\varphi} = N_\beta \beta + N_r \dot{\varphi} + N_\delta \delta \qquad (1)$$

$$mV(\dot{\varphi} + \dot{\beta}) = Y_\beta \beta + Y_r \dot{\varphi} + Y_{67} \delta \qquad (2)$$

$$Izz^*\ddot{\varphi} = N_\beta \beta + N_r \dot{\varphi} + N_{67} \delta \qquad (1)$$

$$mV(\dot{\varphi} + \dot{\beta}) = Y_\beta \beta + Y_r \dot{\varphi} + Y_\delta \delta \qquad (2)$$

where $$Y_\beta = C_F + C_R$$

$$Y_r = (l/V)(aC_F - bC_R)$$

$$Y_\delta = -C_F$$

$$N_\beta = aC_F - bC$$

$$N_r = (l/V)(a^2 C_F - b^2 C_R)$$

$$N_\delta = -aC_F$$

Substituting in these equations and re-arranging them into state-space form provides the following equations:

$$\dot{x} = Ax + Bu \qquad (3)$$

$$y = Cx + Du \qquad (4)$$

$$\begin{pmatrix} \dot{\varphi} \\ \dot{\beta} \end{pmatrix} = \begin{pmatrix} \frac{N_\beta}{I_=} & \frac{N_r}{I_=} \\ \frac{Y_\beta}{mV} & \left(\frac{Y_r}{mV} - 1\right) \end{pmatrix} \begin{pmatrix} \beta \\ \varphi \end{pmatrix} + \begin{pmatrix} \frac{N_\delta}{I_=} \\ \frac{Y_\delta}{mV} \end{pmatrix} (\delta) \qquad (5)$$

The 2 DOF bicycle model requires tire stiffness, $C_F$ and $C_R$ for each axle.

$$C_F = \frac{F_{y \cdot F}}{\alpha_F} \qquad (6)$$

$$C_R = \frac{F_{y \cdot R}}{\alpha_R} \qquad (7)$$

$$F_{y \cdot F}(\alpha_F(\dot{\varphi}_{measured\ or\ estimated}, V_x, \beta_{estimated}, \delta_{FWA}), W_F) \qquad (8)$$

$$F_{y \cdot R}(\alpha_R(\dot{\varphi}_{measured\ or\ estimated}, V_x, \beta_{estimated}), W_F) \qquad (9)$$

$$\alpha_F = \beta_{estimated} + \left(\frac{\dot{\varphi}_{measured\ or\ estimated}}{V_{x,measured\ or\ estimated}} * a\right) - \delta_f \qquad (10)$$

$$\alpha_R = \beta_{estimated} + \left(\frac{\dot{\varphi}_{measured\ or\ estimated}}{V_{x,measured\ or\ estimated}} * b\right) \qquad (11)$$

$$W_F = \left(1 - \frac{a}{a+b}\right) * m_{veh} * 9.81 \qquad (12)$$

$$W_R = \left(\frac{a}{a+b}\right) * m_{veh} * 9.81 \qquad (13)$$

The calculated body side slip value β 2 DOF is provided in a line 72 to a first two input comparator 76 which also receives a body side slip reference value β REF. Similarly, the calculated or measured yaw rate value φ dot is provided in a line 74 to a second two input comparator 78 which is supplied with a yaw rate reference signal. The output of the first comparator 76 is supplied to a body side slip proportional-integral-derivative (PID) controller 82 which provides an output to a torque split determination module 90. Similarly, the output of the second comparator 78 is supplied to a yaw rate proportional-integral-derivative (PID) controller 84 which provides an output to the torque split determination module 90.

Both the body slide slip signal emanating from the body slide slip PID controller 82 and the yaw rate signal emanating from the yaw rate PID controller 84 are scaled to values between −1 and +1 as illustrated in FIG. 1A. Both signals are provided to a torque split determination module 90.

The torque split determination module 90 calculates the percentage of torque split front to rear and left to right utilizing the body slide slip value from the body side slip PID controller 82 and the yaw rate from the yaw rate PID controller 84. The output of the torque split module 90 is a percentage value from 0% to 100% for torque distribution between front and rear and, similarly, a percentage value from 0% to 100% for torque distribution between left and right. The sum of the front and rear outputs is 100% and the sum of the right and the left outputs is 100%. The sum of all four outputs is 200%. The diagonal slopes illustrated in FIG. 1A within the torque split determination module 90 present contrasting slopes of each variable which provide a sliding window of torque proportioning to both the front and rear and the left and right quadrants of the vehicle. The left and right portion of the controller embodies the two equations:

$$T_L = -0.5 * u_v + 0.5 \quad (14)$$

$$T_{Ri} = 0.5 * u_v + 0.5 \quad (15)$$

For example if the yaw rate PID controller 84 provides a yaw rate $U_v$ value of 0.3 this value inserted in these two equations generates a torque left ($T_L$) and a torque right ($T_{Ri}$) signal of 0.35 and 0.65, respectively. Similarly, if the body side slip signal ($U_\beta$) of the body slide slip PID controller 82 is −0.2 the two equations:

$$T_F = -0.5 * u_\beta + 0.5 \quad (16)$$

$$T_R = 0.5 * u_\beta + 0.5 \quad (17)$$

results in the torque front ($T_F$) value being 0.4 and a torque rear ($T_R$) value being 0.6.

Note that the percentage torque left and torque right values always total 1.0 (100%) and the torque front and torque rear values likewise always total 1.0 (100%). The sum of all four torque values is thus always equal to 2.0 (200%). These values are then provided to a torque distribution calculator module 100. The torque distribution calculation module 100 calculates the percentage of torque to be proportioned to each vehicle wheel in accordance with the computations from the torque split module 90. The four torque values (left, right, front and rear) are then combined in the torque distribution calculator module 100 to provide a torque distribution calculation with values corresponding to the four vehicle quadrants and the four tire and wheel assemblies 28L, 28R, 44L and 44R. The calculation utilizes the following equation:

$$\begin{pmatrix} T_F \\ T_R \end{pmatrix} ( T_L \quad T_{Ri} ) = \begin{pmatrix} T_{FL} & T_{FRi} \\ T_{RL} & T_{RRi} \end{pmatrix} \quad (18)$$

Inserting the values $T_F$=0.6, $T_R$=0.4, $T_L$=0.35, $T_{Ri}$=0.65 calculated above into the left side of the equation provides the following results.

$$\begin{pmatrix} 0.6 \\ 0.4 \end{pmatrix} ( 0.35 \quad 0.65 ) = \begin{pmatrix} 0.21 & 0.39 \\ 0.14 & 0.26 \end{pmatrix} \quad (19)$$

Note, once again, that the four computed torque values (0.21, 0.39, 0.14 and 0.26) total 1.00 or 100% of the torque available to be delivered and split among the four tire and wheel assemblies 28L, 28R, 44L and 44R.

Returning to FIG. 1B, these four torque values are provided to a driveline architecture definition module 110 which stores data regarding both the actual physical layout of the motor vehicle chassis and power train assembly 10 such as the one illustrated in FIG. 1B and also operational parameters which provide the desired or optimum handling and performance characteristics of the given vehicle. For example, vehicle designers typically have specific objectives for how a particular vehicle should handle which differs from vehicle type to vehicle type. It may be desirable for a sporty vehicle to have a greater body slide slip under heavy acceleration through a corner. For a luxury sedan, a more stable character will typically be desirable.

Furthermore, and as noted above, a typical vehicle may be outfitted with various clutch and driveline configurations. For example, the motor vehicle assembly 10 may include either the secondary driveline friction clutch 34 or the rear axle clutches 42L and 42R but not both. As well, the front or primary drive system 20 may not include individual axle clutches 26L and 26R. In this regard, it is the intention of the inventors to provide a universal control system which may be utilized with and have outputs for virtually any driveline configuration of clutches and differentials and utilize only those outputs and control signals suitable or appropriate for any particular vehicle and its mechanical driveline and clutch configuration. Accordingly, the driveline architecture definition module 110 will include memory, software and look-up tables, for example, that ultimately control the magnitude of torque delivery signals to the various clutches existing in the particular driveline architecture based upon experimental and empirical data relating the particular vehicle. That is, the actual torque signal to a particular clutch will, of course, first of all, be determined by whether or not there is a clutch, e.g., a single secondary driveline clutch 34 would be provided a signal representing the sum of the two signals for the individual rear axle clutches 42L and 42R if the former and not the latter were utilized in a particular vehicle and, second of all, by the desired performance characteristics of the vehicle. Such control will also be affected by an available torque signal which is provided, typically by an engine speed sensor 112 within the prime mover 12 through a line 114 to the driveline architecture definition module 110. A still more accurate torque value may be provided by monitoring not only the speed of the prime mover 12 with the speed sensor 112 but also utilizing a gear ration sensor (not illustrated) or data from the transmission, transaxle 14 or CAN to provide data regarding the currently selected gear ratio. This data may then be used to accurately calculate available or delivered torque.

With regard to such distinct or variable vehicle architecture five examples are given below. In a first configuration, the vehicle or assembly 10 incorporates four axle clutches 26A, 26B, 42A and 42B as illustrated in FIG. 1B but does not include the clutch 34 ahead of the secondary or rear differential 36 in the secondary drive assembly 20. The clutch 34 is replaced by a direct connection between the propshaft 32 and the rear differential 36. Using the same previously calculated values, the following equation sets forth the four torque requests as multiplied by the available torque. In all of the following examples, available torque is somewhat arbitrarily chosen as 120 Newton meters.

$$\begin{pmatrix} T_{FL} & T_{FRi} \\ T_{RL} & T_{RRi} \end{pmatrix} * T_{avail}(N_m) = \begin{pmatrix} T_{req.FL} & T_{req.FR} \\ T_{RL} & T_{req.RRi} \end{pmatrix} N_m \qquad (20)$$

$$\begin{pmatrix} 0.21 & 0.39 \\ 0.14 & 0.26 \end{pmatrix} * 120 N_m = \begin{pmatrix} 25.2 & 46.8 \\ 16.8 & 31.2 \end{pmatrix} N_m \qquad (21)$$

Thus, the front left tire and wheel assembly 28L receives 25.2 Newton meters of torque, the front right tire and wheel assembly 28R receives 46.8 Newton meters of torque, the rear left tire and wheel assembly 44L receives 16.8 Newton meters of torque, and the right rear tire and wheel assembly 44R receives 31.2 Newton meters of torque, A second configuration of the vehicle or assembly 10 is a primary front wheel drive configuration in which the front differential 22 directly drives the front tire and wheel assemblies 28L and 28R and only the secondary driveline clutch 34 is present. None of the axle clutches 26A, 26B, 42A or 42B are utilized. In this case the driveline architecture equation is:

$$\begin{pmatrix} T_{FL} & T_{FRi} \\ T_{RL} + & T_{RRi} \end{pmatrix} * T_{avail}(N_m) = \begin{pmatrix} 0 \\ T_{req.RL} + T_{req.RRi} \end{pmatrix} N_m \qquad (22)$$

Again, using the values previously computed and supplied to the driveline architecture definition module 110 the equation becomes:

$$\begin{pmatrix} 0.21 & 0.39 \\ 0.14 + & 0.26 \end{pmatrix} * T_{avail}(N_m) = \begin{pmatrix} 0 \\ 16.8 + 31.2 \end{pmatrix} N_m = \begin{pmatrix} 0 \\ 58.0 \end{pmatrix} N_m \qquad (23)$$

The combined rear torque signal is provided to the secondary driveline clutch 34 in a line 116 which directs 58 Newton meters of torque to the rear differential 36.

A third configuration effectively reverses the driveline layout of the second example. That is, the vehicle is a primary rear wheel drive vehicle in which a clutch, similar to the clutch 34 which will typically be disposed in a transfer case, drives the front tire and wheel assemblies 28L and 28R intermittently or on demand through a front differential 22 while the rear tire and wheel assemblies 44A and 44B are driven constantly through a conventional rear differential 36.

Here the operational equation within the driveline architecture definition module 110 is:

$$\begin{pmatrix} T_{FL} & T_{FRi} \\ T_{RL} & T_{RRi} \end{pmatrix} * T_{avail}(N_m) = \begin{pmatrix} T_{req.FL} & T_{req.RRi} \\ 0 \end{pmatrix} (N_m) \qquad (24)$$

Using the same values from the torque split determination module 90:

$$\begin{pmatrix} 0.21 & 0.39 \\ 0.14 & 0.26 \end{pmatrix} * 120(N_m) = \begin{pmatrix} 25.2 + 46.8 \\ 0 \end{pmatrix} (N_m) = \begin{pmatrix} 72.0 \\ 0 \end{pmatrix} (N_m) \qquad (25)$$

Thus, a single front clutch provides 72 Newton meters of torque to the front differential 22 which is delivered to the front tire and wheel assemblies 28L and 28R in accordance with the operation of the front differential 22.

A fourth configuration is essentially as illustrated in FIG. 1B wherein the vehicle or assembly 10 includes two rear axle clutches 42A and 42B driven by the rear differential 36 but includes neither the secondary driveline clutch 34, there being a direct connection between the propshaft 32 and the input of the secondary or rear differential 36 nor the front axle clutches 26A and 26B. Here the operation is:

$$\begin{pmatrix} T_{FL} & T_{FRi} \\ T_{RL} & T_{RRi} \end{pmatrix} * T_{avail}(N_m) = \begin{pmatrix} 0 & 0 \\ T_{req.FL} & T_{req.RRi} \end{pmatrix} (N_m) \qquad (26)$$

Inserting the previously calculated values:

$$\begin{pmatrix} 0.21 & 0.39 \\ 0.14 & 0.26 \end{pmatrix} * 120(N_m) = \begin{pmatrix} 0 & 0 \\ 16.8 & 31.2 \end{pmatrix} (N_m) \qquad (27)$$

Thus the left rear clutch 42A is engaged to provide 16.8 Newton meters of torque and the right rear clutch 42B is engaged to provide 31.2 Newton meters of torque.

A fifth and final configuration is similar to the third example described above in that the vehicle or assembly 10 is a primary rear wheel drive vehicle, thus including the rear differential 36 which is driven directly by the propshaft 32 and directly drive the left and right rear tire and wheel assemblies 44L and 44R, respectively (omitting the clutches 34, 42A and 42B) and including the front axle clutches 26A and 26B. The torque architecture equation is thus $$\begin{pmatrix} T_{FL} & T_{FRi} \\ T_{LR} & T_{RRi} \end{pmatrix} * T_{avail}(N_m) = \begin{pmatrix} T_{req.FL} & T_{req.FR} \\ T_{req.FL} & T_{req.RRi} \end{pmatrix} (N_m) \qquad (28)$$

Substituting in the previously calculated values provides the values of torque delivered to the front tire and wheel axles 28L and 28R.

$$\begin{pmatrix} 0.21 & 0.39 \\ 0.14 & 0.26 \end{pmatrix} * 120(N_m) \begin{pmatrix} 25.2 & 46.8 \\ 0 & 0 \end{pmatrix} (N_m) \qquad (29)$$

Thus, the left front clutch 26A is engaged to provide 25.2 Newton meters of torque and the right front clutch 26B is engaged to provide 46.8 Newton meters of torque.

The foregoing disclosure is the best mode devised by the inventors for practicing this invention. It is apparent, however, that apparatus incorporating modifications and variations will be obvious to one skilled in the art of motor vehicle torque delivery systems. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We Claim:

1. A method for controlling torque delivery to the wheels of a motor vehicle comprising the steps of:
   sensing speeds of the wheels and sensing vehicle steering angle;
   determining a vehicle yaw rate value and calculating a body side slip value from said speeds and said angle;
   computing front and rear torque split values and left and right torque split values from the determined yaw rate and body side slip values; wherein the front and rear torque split values range from 0% to 100% with the sum totaling 100% and the left and right torque split values range from 0% to 100% with the sum totaling 100%;
   computing a torque request for each vehicle wheel from the front and rear and the left and right torque split values, such that the sum of the torque request for each wheel totals 100% of the torque available to be delivered; and
   applying said torque request in accordance with architecture of said vehicle.

2. The method of controlling torque delivery of claim 1 further including the step of sensing torque output of a prime mover of said vehicle.

3. The method of controlling torque delivery of claim 1 wherein said front and rear torque split value is a percentage which totals 100% and said lefty and right torque value is a percentage which totals 100%.

4. The method of controlling torque delivery of claim 1 wherein said architecture includes a modulating clutch associated with each vehicle wheel.

5. The method of controlling torque delivery of claim 1 wherein said architecture includes a modulating clutch driving a secondary differential of said vehicle associated with at least two of said wheels.

6. The method of controlling torque delivery of claim 1 further including the step of sensing a yaw rate of said vehicle.

7. The method of controlling torque delivery of claim 1 further including the step of providing a steering angle sensor associated with a steering column for determining said vehicle steering angle.

8. A method of proportioning torque delivery to wheels of a four wheel vehicle comprising the steps of
   providing a plurality of wheel speed sensors and a steering angle sensor;
   providing a processor for determining a vehicle yaw rate and a body side slip rate based upon signals from said sensors;
   providing said yaw rate and said body side slip rate to a torque splitter module to generate a front, a rear, a left and a right torque split; wherein the front and rear torque split values range from 0% to 100% with the sum totaling 100% and the left and right torque split values range from 0% to 100% with the sum totaling 100%;
   generating four torque requests corresponding to the wheels of said vehicle from said torque split values, such that the sum of the four torque requests is 100% of the torque available to be delivered;
   adjusting said torque requests in accordance with a driveline configuration of said vehicle.

9. The torque proportioning method of claim 8 further including the step of providing a plurality of modulating clutches and controlling said modulating clutches in accordance with said adjusted torque request.

10. The torque proportioning method of claim 8 further including the step of sensing torque output of a prime mover of said vehicle.

11. The torque proportioning method of claim 8 wherein said front and rear torque split values are percentages which total 100% and said left, right torque values are percentages which total 100%.

12. The torque proportioning method of claim 8 wherein said architecture includes a modulating clutch associated with each of said wheels.

13. The torque proportioning method of claim 8 wherein said architecture includes a modulating clutch driving a secondary differential of said vehicle.

14. The torque proportioning method of claim 8 further including the step of providing a steering angle sensor associated with a steering column.

15. An apparatus for determining torque delivery to wheels of a motor vehicle comprising:
   a plurality of wheel speed sensors,
   means for sensing an angle of a steering component,
   means for providing a body side slip value,
   means for determining four torque split values associated with left and right front wheels and left and right rear wheels of said vehicle,
   means for generating four torque request values, such that the sum of the four torque requests is 100% of the torque available to be delivered, and
   means for adjusting said torque request values in accordance with driveline architecture of said vehicle.

16. The apparatus for determining torque delivery of claim 15 further including a plurality of modulating clutches disposed in a drive system of said vehicle.

17. The apparatus for determining torque delivery of claim 15 wherein said angle sensing means is a rotation sensor associated with a steering column of said vehicle.

18. The apparatus for determining torque delivery of claim 15 wherein said means for providing a yaw rate value is a yaw rate sensor.

19. The apparatus for determining torque delivery of claim 15 wherein said means for providing a body side slip value includes a processor for receiving outputs from said wheel speed sensors and said angle sensing means.

20. The apparatus for determining torque delivery of claim 15 wherein said means for generating four torque requests includes outputs associated with said left front, right front, left rear and right rear wheels of said vehicle.

* * * * *